United States Patent Office 2,721,208
Patented Oct. 18, 1955

2,721,208

QUATERNARY-AMMONIUM-SALT OF N-β-AMINOETHYL CARBAMATES

Kathryn A. Losee, New Brunswick, and William A. Lott, Maplewood, N. J., assignors to Olin Mathieson Chemical Corporation, New York, N. Y., a corporation of Virginia No Drawing. Application November 30, 1951,
Serial No. 259,302

12 Claims. (Cl. 260—471)

This invention relates to a novel class of cationic detergents characterized by being esters of carbamic acid and also by containing a quaternary ammonium group.

The compounds of the invention are of the general formula

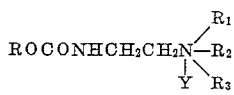

wherein R represents a (higher alkyl)-substituted aryl radical or a higher alkyl radical derived from a secondary alcohol, $R_1$ and $R_2$ each represent an alkyl, cycloalkyl or aryl group, $R_3$ represents an aralkyl group, and Y represents an anion, preferably a halogen.

Compounds within the scope of the class described above include those in which the higher alkyl radical defined by R is the hydrocarbon residue of a secondary alcohol, such as the following: 3,9-diethyl-tridecanol-6; 2,8 - dimethyl-nonanol-5; 2-methyl-decanol-4; 7-ethyl-2-methyl-undecanol-4; 6-dodecanol; and 4-decanol. The radicals defined by R may also include alkyl-substituted aryl radicals wherein the hydrocarbon residues of (1) secondary alcohols, such as those enumerated above, or (2) of other higher alkanols (such as n-octyl alcohol, n-nonyl alcohol, n-decyl alcohol, n-dodecyl alcohol, n-octadecyl alcohol, 3-ethyl-octyl alcohol, and 2-methyl-nonyl alcohol) are attached to aryl nuclei to form such radicals as p-octyl-phenyl, p-decyl-naphthyl, p-(3-ethyl)-octyl - phenyl, m-(2-methyl)-nonyl-phenyl, m-dodecyl-phenyl, etc.

Likewise, the radicals designated as $R_1$ and $R_2$ are subject to wide variation. They may be alike or different; and they may be aliphatic, cycloaliphatic or aromatic. Thus, these may be methyl and methyl, ethyl and ethyl, methyl and ethyl, methyl and isopropyl, ethyl and cyclohexyl, ethyl and benzyl, octyl and cyclohexyl, methyl and phenyl, etc.

$R_3$ may be any aralkyl radical, such as benzyl, phenethyl, naphthyl-methyl, and xylyl.

The anion Y is preferably chlorine or bromine, but may be any halogen, or any other anion such as sulfate, ethyl sulfate, phosphate, thiocyanate, etc.

The compounds of the invention may be prepared according to the following general scheme:

I         ROH+XCOX→ROCOX+HX

II ROCOX+H₂NCH₂CH₂NR₁R₂→
                         ROCONHCH₂CH₂NR₁R₂+HX

III

ROCONHCH₂CH₂NR₁R₂+R₃Y ⟶ ROCONHCH₂CH₂N(R₁R₂R₃)⁺Y⁻ wherein R, $R_1$, $R_2$, $R_3$ and Y have the same meanings as those given hereinbefore, and X is a halogen, preferably chlorine or bromine.

The reaction conditions are, of course, subject to variation. As to the reaction medium, it is preferred to carry out the process in an anhydrous organic solvent, such as benzene, toluene, xylene, or hexane. As to the proportions of the reactants, wide latitude is permissible; however, it is preferred to employ substantially stoichiometric amounts of the reactants in the quaternization reaction III.

The compounds of the invention are generally solids or syrupy liquids, which may be dispersed in water to form stable suspensions; they are soluble in polar solvents, such as methanol and ethanol, but are less soluble in such media as ethyl ether, benzene, and petroleum ether.

The compounds of the invention are excellent cationic detergents. In addition, they have definite bactericidal value, the compound benzyldiethyl-2-[N-carboheptadecyloxy)-amino]-ethylammonium chloride, for example, causing almost complete growth stoppage of *Mycobacterium tuberculosis* in concentrations of 1 part of quaternary salt per 100 or more parts of water.

Following are specific examples illustrating, but not limiting, the invention:

EXAMPLE 1

*Benzyldiethyl-2-[N-(carboheptadecyloxy)-aminol]-ethylammonium chloride*

(a) 256 g. 3,9-diethyl-tridecanol-6 is dissolved in 1200 ml. of anhydrous benzene in a suitable vessel. Phosgene is then passed into the benzene solution until an increase in weight of 99 g. is effected. During the addition of phosgene, the vessel is cooled externally (i. e., by means of Dry Ice-alcohol) so that the reaction temperature is maintained in the vicinity of 5°–25° C. After completing the addition of phosgene and while maintaining the external cooling, a solution of 121 g. dimethylaniline in 100 ml. anhydrous benzene is slowly added to the reaction mixture. The resulting solution is rapidly washed with 100 ml. portions of ice water until no substantial amount of chlorides is detected in the water layer. The purified benzene solution is then rapidly dried by the addition of anhydrous sodium sulfate. The benzene in the dried solution is removed by distillation, and the heptadecyl chlorocarbonate is recovered by vacuum distillation at 132–140° C. and 3 mm. pressure.

(b) 32 g. heptadecyl chlorocarbonate, obtained as described in (a), is dissolved in 160 ml. anhydrous benzene, and to it is added 23 g. β-diethylamino-ethylamine dissolved in 80 ml. benzene. In the ensuing reaction, a perceptible amount of heat is generated, and a portion of the β-diethylamino-ethylamine separates out as the hydrochloride. After removing the hydrochloride by filtration, the benzene solution is washed with ice water until it is substantially free from chlorides, and dried by treatment with anhydrous potassium carbonate. Then, after removing the benzene by distillation, the esterified diamine formed is recovered by vacuum distillation at 175–182° C. and 1 mm. pressure.

(c) 5 g. of the esterified diamine obtained as described in (b), is mixed with 1.6 g. benzyl chloride and the mixture is heated on a steam bath for three hours. The reaction mixture is allowed to remain at room temperature overnight. Then, after adding 2 ml. benzyl chloride, heating of the reaction mixture is resumed, and the temperature is maintained at about 100° C. until reaction is complete. The reaction mixture is then heated in an oil bath at 110° C. under vacuum until substantially all unreacted benzyl chloride is removed. The residue is a viscous, syrupy liquid at room temperature. It has the formula

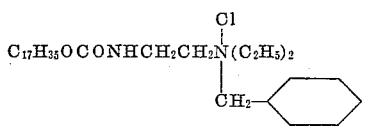

A 10% aqueous solution of this compound, when shaken, forms a thick, albuminous-appearing air-water emulsion which retains its appearance for several weeks; it has a pH of approximately 6.2. Emulsions of the 10% aqueous solution with xylene are stable for long periods, even in dilutions of 1:10,000. The compound has a phenol coefficient of 63 by the standard FDA method, and inhibits the metabolism of both gram positive and gram negative organisms.

EXAMPLE 2

*Benzyldiethyl-2-[N-(carboheptadecyloxy)-amino]-ethylammonium bromide*

22 g. diethyl-2-(heptadecylcarbamyloxy)-ethylamine, obtained as described in sections *a* and *b* of Example 1, is added to 8.6 g. benzyl bromide, and the mixture is warmed on a steam bath for several days. The resulting mixture is then subjected to high vacuum at 25°±5° C. to substantially completely remove unreacted benzyl bromide.

The cationic detergent thus obtained is a waxy crystalline solid having substantially the same detergent and bactericidal properties as those enumerated above for the chloride analog.

EXAMPLE 3

*Benzyldiethyl-2-[N-(carbo-p-octylphenoxy)-amino]-ethylammonium chloride*

(a) 20.6 g. p-octylphenol is dissolved in 200 ml. of aqueous 5% sodium hydroxide and then added, portionwise, with vigorous shaking, to 200 ml. of a 20% solution of phosgene in toluene. During the ensuing reaction, the temperature is maintained at 30°–40° C. by intermittent cooling of the reaction mixture in ice water. After all of the p-octylphenol solution has been added, the reaction mixture is shaken for 30 minutes. The toluene layer is then separated, anhydrous sodium sulfate is added and the solvent separated by distillation. The p-octylphenyl chlorocarbonate remaining is then purified by distillation under reduced pressure.

(b) 26.9 g. p-octylphenyl chlorocarbonate, obtained as described in (a) is dissolved in 150 ml. of anhydrous benzene, and to it is added 23.2 g. β-diethylamino-ethylamine dissolved in 100 ml. benzene. During the ensuing reaction a portion of the β-diethylamino-ethylamine separates out as the hydrochloride. After removing the hydrochloride by filtration, the benzene solution is washed with ice water until it is substantially free from chlorides and dried by treatment with anhydrous potassium carbonate. After removing the benzene by distillation the residue is fractionated under reduced pressure to recover the esterified diamine.

(c) 34.8 g. of the esterified diamine obtained as described in (b) is dissolved in 50 ml. of benzyl alcohol and 12.6 g. of benzyl chloride is added. The mixture is heated on a steam bath for 24 hours to effect quaternization. The benzyl alcohol is separated by distillation under reduced pressure. The residue is a viscous, syrupy liquid at room temperature. It has the formula

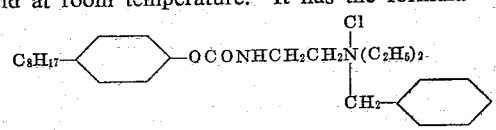

This invention may be variously otherwise embodied within the scope of the appended claims.

We claim:

1. Quaternary ammonium salts of the general formula

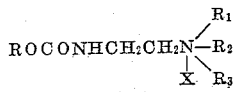

wherein R represents a member of the group consisting of a (higher alkyl)-substituted aryl radical, the higher alkyl group having between 8 and 18 carbon atoms, inclusive, and the aryl nucleus being a member of the group consisting of phenyl and naphthyl, and a higher alkyl radical derived from a secondary alcohol, the higher alkyl group having between 10 and 17 carbon atoms, inclusive, $R_1$ and $R_2$ each represent a lower alkyl group, $R_3$ represents an aryl-(lower alkyl) group, and X represents the anion of a cationic detergent.

2. The compound of claim 1, wherein $R_3$ is benzyl.

3. The compound of claim 2, wherein R represents a (higher alkyl)-substituted aryl radical.

4. The compound of claim 2, wherein R represents a higher alkyl radical derived from a secondary alcohol.

5. A process for preparing quaternary ammonium salts of the formula

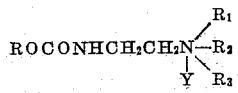

which comprises: (1) reacting the alcohol ROH with the acid halide XCOX to obtain a product ROCOX; (2) treating said product with the amine $H_2NCH_2CH_2NR_1R_2$; (3) reacting the resulting product with the compound $R_3Y$; and (4) recovering the quaternary ammonium salt formed from the reaction mixture; R representing a member of the group consisting of a (higher alkyl)-substituted aryl radical, the higher alkyl group having between 8 and 18 carbon atoms, inclusive, and the aryl nucleus being a member of the group consisting of phenyl and naphthyl, and a higher alkyl radical derived from a secondary alcohol, the higher alkyl group having between 10 and 17 carbon atoms, inclusive, $R_1$ and $R_2$ each representing a lower alkyl group, $R_3$ representing an aryl-(lower alkyl) group, X representing a halogen, and Y being the anion of a cationic detergent.

6. The process of claim 5, wherein $R_3$ is benzyl.

7. The process of claim 6, wherein R represents a (higher alkyl)-substituted aryl radical.

8. The proces of claim 6 wherein R represents a higher alkyl radical derived from a secondary alcohol.

9. A compound of the formula

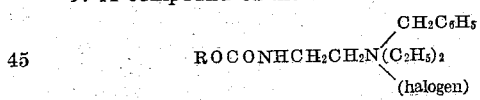

wherein R represents a member of the group consisting of a (higher alkyl)-substituted aryl radical, the higher alkyl group having between 8 and 18 carbon atoms, inclusive, and the aryl nucleus being a member of the group consisting of phenyl and naphthyl, and a higher alkyl radical derived from a secondary alcohol, the higher alkyl group having between 10 and 17 carbon atoms, inclusive.

10. Benzyldiethyl - 2 - [N - (carboheptadecyloxy)-amino]-ethylammonium chloride.

11. Benzyldiethyl - 2 - [N - (carboheptadecyloxy)-amino]-ethylammonium bromide.

12. Benzyldiethyl - 2 - [N - carbo - p - octylphenoxy)-amino]-ethylammonium chloride.

References Cited in the file of this patent

UNITED STATES PATENTS

| | | |
|---|---|---|
| 1,334,642 | Altwegg et al. | Mar. 23, 1920 |
| 1,527,868 | Hartman et al. | Feb. 24, 1925 |

FOREIGN PATENTS

| | | |
|---|---|---|
| 100,407 | Switzerland | Aug. 1, 1923 |

OTHER REFERENCES

Richter, Textbook of Organic Chem. p. 9 (1938), John Wiley & Sons, Inc., New York, N. Y.